(12) United States Patent
Mackie

(10) Patent No.: US 10,440,184 B1
(45) Date of Patent: Oct. 8, 2019

(54) SYSTEM AND METHOD OF AUTOMATED ROUTING AND GUIDANCE BASED ON CONTINUOUS CUSTOMER AND CUSTOMER SERVICE REPRESENTATIVE FEEDBACK

(71) Applicant: Verint Americas Inc., Alpharetta, GA (US)

(72) Inventor: Scott Mackie, Glasgow (GB)

(73) Assignee: Verint Americas Inc., Alpharetta, GA (US)

(*) Notice: Subject to any disclaimer, the term of this patent is extended or adjusted under 35 U.S.C. 154(b) by 0 days.

(21) Appl. No.: 16/225,861

(22) Filed: Dec. 19, 2018

(51) Int. Cl.
| | |
|---|---|
| *H04M 3/51* | (2006.01) |
| *H04M 3/523* | (2006.01) |
| *G06F 16/908* | (2019.01) |
| *G06F 17/27* | (2006.01) |
| *H04M 3/22* | (2006.01) |
| *G06Q 30/00* | (2012.01) |

(52) U.S. Cl.
CPC ........ *H04M 3/5233* (2013.01); *G06F 16/908* (2019.01); *G06F 17/27* (2013.01); *H04M 3/2218* (2013.01); *H04M 3/5141* (2013.01); *H04M 3/5235* (2013.01); *G06Q 30/01* (2013.01)

(58) Field of Classification Search
CPC ....... G06F 16/908; G06F 17/27; G06Q 30/01; H04M 3/2218; H04M 3/5141; H04M 3/5233; H04M 3/5235
See application file for complete search history.

(56) References Cited

U.S. PATENT DOCUMENTS

| | | | |
|---|---|---|---|
| 2008/0167952 A1* | 7/2008 | Blair ...................... | G06Q 10/10 379/265.07 |
| 2012/0084081 A1* | 4/2012 | Melamed ............... | G06Q 30/01 704/211 |

(Continued)

OTHER PUBLICATIONS

Jiang, et al., "Automatic Online Evaluation of Intelligent Assistants," WWW '15 Proceedings of the 24th International Conference on World Wide Web, 506-516 (Florence, Italy, May 18-22, 2015).

*Primary Examiner* — Harry S Hong
(74) *Attorney, Agent, or Firm* — Christopher M. Scherer; DeWitt LLP

(57) ABSTRACT

The present invention is a system and method of routing incoming communications to a CSR and providing guidance to the CSR based on the incoming communication using feedback information such as sentiment feedback, survey feedback, and feedback from actions taken by CSRs based on skill level. A CEC system receives an incoming communication, analyzes the communication and creates metadata based off of the analysis. The metadata is used by the RAE routing module to route the communication to an appropriate party. The metadata is also used by the GAE guidance module to determine the guidance to provide to the CSR. The CSR then performs an action based on the guidance. The CEC system continues to monitor the interaction until the interaction is completed. The communication metadata, the communication, the guidance, and the CSRs action are all provided to a RAS rules analysis module wherein the RAS analyzes the data and automatedly updates the rules (RAR and GAR) according to the analysis.

20 Claims, 4 Drawing Sheets

(56) References Cited

U.S. PATENT DOCUMENTS

| | | | |
|---|---|---|---|
| 2015/0195406 A1* | 7/2015 | Dwyer | H04M 3/5175 379/265.07 |
| 2016/0036980 A1* | 2/2016 | Ristock | H04M 3/5166 379/265.12 |
| 2016/0119477 A1* | 4/2016 | Sharpe | H04W 4/21 379/265.09 |
| 2018/0181561 A1* | 6/2018 | Raanani | G06F 17/2785 |
| 2018/0376002 A1* | 12/2018 | Abraham | H04M 3/5183 |

* cited by examiner

SYSTEM AND METHOD OF AUTOMATED ROUTING AND GUIDANCE BASED ON CONTINUOUS CUSTOMER AND CUSTOMER SERVICE REPRESENTATIVE FEEDBACK

FIELD

The present disclosure is directed to systems and methods of automated computer analysis. Specifically, automated systems and methods of routing incoming communication and providing guidance regarding incoming communications based on continuous feedback received by the system.

BACKGROUND

In modern high-volume customer engagement centers (CEC), there are a number of ways communication between a customer service representative (CSR) and a customer can take place. For example, communication in a CEC can take place over the telephone, through email, and text chat, among other known communication methods. Further it is often the case that a customer contact or communication requires a wide variety of communication protocols and resources. It is extremely important for a CEC system to provide efficient and proper routing of incoming customer communication. It is just as important for a CEC system to provide CSRs with accurate and helpful guidance for servicing the incoming customer communications routed to them.

There are a number of methods and systems designed to assist in the routing of incoming customer communications and provide recommendations to CSRs to assist in servicing the incoming customer communication. Typically, these methods and systems receive initial data regarding the incoming communication and determine how to route/provide recommendations based on that initial data and a set of static generalized rules. Further, these known systems and methods do not utilize the different types of feedback a company may receive from when making a routing/recommendation determination.

For example, the system may have static rules that indicate certain types of communications, such as phone calls about changing services, are to be directed to one of particular group of CSRs. Those CSRs might also be assigned to handle other types of interactions as well. When an incoming communication occurs, the system will route all phone calls about changing services to that set of CSRs. The system might also even have a general ranking of each CSR and take the general ranking into account when routing or determining guidance to recommend. However, typical systems are not robust enough to determine that one of the CSRs assigned to the group for handling phone calls about changing services has been getting poor feedback on those particular types of calls. Further, due to the nature of static rules that are manually updated when changes are needed, even if the system is robust enough, the rule change would need to be implemented manually.

In another example, a CSR assigned to communicate with a high-value customer may mistakenly use an old communication protocol still stored in the CEC computer system as opposed to a new protocol designed to account for the customer's new preferences. By the time the CSR realizes their mistake, the customer relationship may be damaged.

There is an unmet need in the art for a system capable of automatically analyzing customer service interactions including feedback provided by customer surveys, feedback provided by customer sentiment, and feedback provided by the results of decisions made by CSRs and automatedly updating routing rules and recommendation rules based on the analysis.

SUMMARY

An embodiment of the present application includes a method for routing based on customer sentiment. Incoming communication from outside a CEC system from a customer is received and analyzed using a metadata analytics service (MAS). The incoming communication is designated an initial communication. An initial communication is a communication that has not been previously assigned to a CSR. The analysis determines a client sentiment of the incoming communication. Based on the analysis of the MAS software module, the MAS software module generates communication metadata for the incoming communication, which the MAS passes, along with the incoming communication to a routing analysis engine (RAE). The communication metadata includes at least sentiment data. The RAE also receives a set of routing analytics rules (RAR) and performs an analysis of the communication metadata using a RAE software module based on the sentiment data and RAR. The RAE and determines one of a CSR, CSR group, a queue, or a queue group to receive the incoming communication. The RAE passes the incoming communication to the assigned CSR. The RAE then changes the designation of the incoming communication to monitored communication and passes the incoming communication, the CSR designation, and the communication metadata for the incoming communication to the to a rules analytics service (RAS). A monitored communication is one that has been routed to a CSR. The RAS preforms an analysis of the RAR using a RAS software module based on the sentiment data and CSR designation. The RAS updates the set of RAR based on the analysis of the RAS software module.

An embodiment of the present application includes a method of guidance based on customer sentiment. Incoming communication from outside a CEC system from a customer is received and analyzed using a metadata analytics service (MAS). The incoming communication is a monitored communication. A monitored communication is an incoming communication that is part of an ongoing customer interaction that has already been routed and has a set of stored data associated with it. The analysis determines a client sentiment of the incoming communication. Based on the analysis of the MAS software module, the MAS software module generates communication metadata for the incoming communication, which the MAS passes, along with the incoming communication and stored data to a guidance analysis engine (GAE). The communication metadata includes at least sentiment data for the incoming communication. The GAE receives a set of guidance analytics rules (GAR). The GAE performs an analysis of the incoming communication and the communication metadata using a GAE software module based on the sentiment data and GAR. The GAE assigns at least one of a guidance to the incoming communication based on the analysis of the GAE software module and displays the guidance on a CEC desktop. The GAE passes the guidance, the incoming communication, the stored data, and the communication metadata to a RAS. The RAS receives a CSR action associated with the incoming communication. The RAS preforms an analysis of the GAR using a RAS software module based on the sentiment data, incoming communication, the communication metadata and the CSR action. The RAS updates the set of GAR based on the analysis of the RAS software module.

An embodiment of the present application includes a system for routing and guidance of incoming communications based on client sentiment. The system includes a processor and a non-transitory computer readable medium programmed with computer readable code. Upon execution of the computer readable medium, the processor receives an incoming communication from outside a customer engagement center (CEC) system. The incoming communication is designated as an initial communication or as a monitored communication. An initial communication is a communication that has not been previously assigned to a CSR. A monitored communication is an incoming communication that is part of an ongoing customer interaction that has already been routed and has a set of stored data associated with it. A MAS unit causes the processor to perform an analysis of the incoming communication using a metadata analytics service (MAS) software module on a MAS unit, wherein the analysis includes a determination of a customer sentiment. Based on the analysis, the MAS generates communication metadata for the incoming communication. The metadata includes at least sentiment data based on the customer sentiment determination. If the incoming communication is designated initial communication, the MAS passes the incoming communication and the communication metadata to a routing analysis engine (RAE). The RAE causes the processor to receive a set of routing analytics rules (RAR) at the RAE and performs an analysis of the incoming communication using a RAE software module based on the sentiment data and the set of RAR. Based on the analysis of the RAE the processor designates one of a customer service representative (CSR), CSR group, a queue, or a queue group to receive the incoming communication and the incoming communication designation is changed to a monitored communication. The incoming communication is passed to the CSR, CSR group, queue, or queue group designated to receive the incoming communication. Additionally, the incoming communication, the communication metadata, and the CSR designation is passed to a rules analytics service (RAS) software module. The RAS causes the processor to perform an analysis of the RAR using the RAS software module based on the sentiment data and the CSR designation, and update the set of RAR based on the analysis of the RAS software module. If the incoming communication is designated monitored communication, the MAS passes the incoming communication, the stored data, and the communication metadata to a guidance analysis engine (GAE). The GAE causes the processor to receive a set of guidance analytics rules (GAR) and performs an analysis of the communication metadata using a GAE software module based on the sentiment data and the set of GAR. The processor assigns a guidance based on the analysis of the GAE software module and displays the guidance on a CSR desktop. The incoming communication, the communication metadata, the guidance, and the stored data are passed to to the RAS software module. The RAS receives a CSR action associated with the incoming communication, performs an analysis of the GAR using the RAS software module based on the sentiment data and the CSR action, and updates the set of GAR based on the analysis of the RAS software module.

An embodiment of the present application includes a method for routing based on customer survey feedback. Incoming communication from outside a CEC system from a customer is received and analyzed using a metadata analytics service (MAS). The incoming communication is an initial communication. An initial communication is a communication that has not been routed to a CSR. Based on the analysis of the MAS software module, the MAS software module generates communication metadata for the incoming communication, which the MAS passes, along with the incoming communication to a routing analysis engine (RAE). The RAE receives a set of RAR. The RAE performs an analysis of the incoming communication and the communication metadata using a RAE software module based on the RAR, determines one of a CSR, CSR group, a queue, or a queue group to receive the incoming communication, and sends the incoming communication to the designated CSR. The RAE then changes the designation of the incoming communication to monitored communication and passes the incoming communication, the CSR designation, and the communication metadata for the incoming communication to the to a rules analytics service (RAS). The RAS stores the incoming communication, the communication metadata, and the CSR designation. Optionally, the RAS may send a customer survey to the customer or the RAS may instruct the system to send a customer survey to the customer. The customer survey is associated with the incoming communication. When the RAS receives customer survey data associated with the incoming communication, the RAS preforms an analysis of the RAR using a RAS software module based on the customer survey data and CSR designation. The RAS updates the set of RAR based on the analysis of the RAS software module.

An embodiment of the present application includes a method of guidance based on customer survey feedback. Incoming communication from outside a CEC system from a customer is received and analyzed using a metadata analytics service (MAS). The incoming communication is a monitored communication. A monitored communication is an incoming communication that is part of an ongoing customer interaction that has already been routed and has stored data associated with it. Based on the analysis of the MAS software module, the MAS software module generates communication metadata for the incoming communication, which the MAS passes, along with the incoming communication and stored data to a guidance analysis engine (GAE). The GAE receives a set of GAR. The GAE performs an analysis of the incoming communication using a GAE software module based on the communication metadata and the GAR. The GAE assigns at least one guidance to the incoming communication based on the analysis of the GAE software module and displays the guidance on a CEC desktop. The GAE passes the guidance, the incoming communication, the stored data, and the communication metadata to a RAS. The RAS receives a CSR action associated with the incoming communication. The RAS stores the incoming communication, the communication metadata, the guidance, the stored data, and the CSR action to RAS storage. The RAS may send a customer survey to the customer. The customer survey is associated with the incoming communication. When the RAS receives customer survey data associated with the incoming communication, the RAS preforms an analysis of the GAR using a RAS software module based on the customer survey data, the communication metadata, and CSR action. The RAS updates the set of GAR based on the analysis of the RAS software module.

An embodiment of the present application includes a system for routing and guidance of incoming communications based on customer survey feedback. The system includes a processor and a non-transitory computer readable medium programmed with computer readable code. Upon execution of the computer readable medium, the processor receives an incoming communication from outside a customer engagement center (CEC) system. The incoming communication is designated as an initial communication or as a monitored communication. An initial communication is a communication that has not been previously assigned to a CSR. A monitored communication is an incoming communication that is part of an ongoing customer interaction that has already been routed and has a set of stored data associated with it. A MAS unit causes the processor to perform an analysis of the incoming communication using a metadata analytics service (MAS) software module on a MAS unit. Based on the analysis, the MAS generates communication metadata for the incoming communication. If the incoming communication is designated initial communication, the MAS passes the incoming communication and the communication metadata to a routing analysis engine (RAE). The RAE causes the processor to receive a set of routing analytics rules (RAR) at the RAE and performs an analysis of the incoming communication using a RAE software module based on the communication metadata and the set of RAR. Based on the analysis of the RAE the processor designates one of a customer service representative (CSR), CSR group, a queue, or a queue group to receive the incoming communication and the incoming communication designation is changed to a monitored communication. The incoming communication is passed to the CSR, CSR group, queue, or queue group designated to receive the incoming communication. The RAS causes the processor to store the incoming communication, the communication metadata, and the CSR designation. The RAS may send a customer survey to the customer. The customer survey is associated with the incoming communication. When the customer survey data associated with the incoming communication is received, the RAS causes the processor to perform an analysis of the RAR using a RAS software module based on the customer survey data and CSR designation and update the set of RAR based on the analysis of the RAS software module. If the incoming communication is designated monitored communication, the MAS passes the incoming communication, the stored data, and the communication metadata to a guidance analysis engine (GAE). The GAE causes the processor to receive a set of guidance analytics rules (GAR) and performs an analysis of the incoming communication using a GAE software module based on the communication metadata, stored data, and the set of GAR. The processor assigns a guidance based on the analysis of the GAE software module and displays the guidance on a CSR desktop. The incoming communication, the communication metadata, the guidance, and the stored data are passed to the RAS software module. The RAS receives a CSR action associated with the incoming communication. The RAS causes the processor to store the incoming communication, the communication metadata, the guidance, the stored data, and the CSR action to RAS storage. The RAS may send a customer survey to the customer. The customer survey is associated with the incoming communication. When the customer survey data associated with the incoming communication is received, the RAS causes the processor to perform an analysis of the GAR using a RAS software module based on the customer survey data, the communication metadata, and CSR action and update the set of GAR based on the analysis of the RAS software module.

An embodiment of the present application includes a method of guidance based on CSR action weighted by CSR skill level for the skill required by the incoming communication. Incoming communication from outside a CEC system from a customer is received and analyzed using a metadata analytics service (MAS), wherein the analysis includes a determination of a conversation type for the incoming communication. The incoming communication is a monitored communication. A monitored communication is an incoming communication that is part of an ongoing customer interaction that has already been routed. A monitored communication includes stored data associated with the incoming communication. The stored data includes at least a CSR designation and a set of CSR skill levels associated with the CSR designation. Based on the analysis of the MAS software module, the MAS software module generates communication metadata for the incoming communication, which the MAS passes, along with the incoming communication and stored data to a guidance analysis engine (GAE). The communication metadata includes skill type for the incoming communication. The GAE receives a set of GAR. The GAE performs an analysis of the incoming communication using a GAE software module based on the skill type and the GAR. The GAE assigns at least one of a guidance to the incoming communication based on the analysis of the GAE software module and displays the guidance on a CEC desktop. The GAE passes the guidance, the incoming communication, the stored data, and the communication metadata to a RAS. The RAS receives a CSR action associated with the incoming communication. The RAS preforms an analysis of GAR using a RAS software module based on the CSR skill level associated with the skill type for the incoming communication, the incoming communication, the communication metadata and the CSR action. The RAS updates the set of GAR based on the analysis of the RAS software module.

An embodiment of the present application includes a system for guidance of incoming communications based on CSR action weighted by CSR skill level for the skill required by the incoming communication. The system includes a processor and a non-transitory computer readable medium programmed with computer readable code. Upon execution of the computer readable medium, the processor receives an incoming communication from outside a customer engagement center (CEC) system. The incoming communication is a monitored communication. A monitored communication is an incoming communication that is part of an ongoing customer interaction that has already been routed and has a set of stored data associated with it. The set of stored data includes a CSR designation for the incoming communication and a set of CSR skill levels associated with the CRS designation. A MAS unit causes the processor to perform an analysis of the incoming communication using a metadata analytics service (MAS) software module on a MAS unit, wherein the analysis includes a determination of a conversation type for the incoming communication. Based on the analysis, the MAS generates communication metadata for the incoming communication. The metadata includes at least a skill type based on the conversation type determination. The MAS passes the incoming communication, the stored data, and the communication metadata to a guidance analysis engine (GAE). The GAE causes the processor to receive a set of guidance analytics rules (GAR) and performs an analysis of the communication metadata using a GAE software module based on the skill type and the set of GAR. The processor assigns a guidance based on the analysis of the GAE software module and displays the guidance on a CSR desktop. The incoming communication, the communication metadata, the guidance, and the stored data are passed to the RAS software module. The RAS receives a CSR action associated with the incoming communication, performs an analysis of GAR using a RAS software module based on the CSR skill level associated with the skill type for the incoming communication, the incoming communication, the communication metadata and the CSR action, and updates the set of GAR based on the analysis of the RAS software module.

In embodiments that provide for routing and guidance based, as least in part, on prior actions taken by CSRs, the routing decisions and guidance will be weighted by the CSRs skill level as it pertains to the action taken. For example, an employee who processes complaints may have a specific skill associated with them in the CEC system's model for that task. Each employee in the system will have multiple skills modelled against them, representing the variety of different tasks they will carry out as part of their job. For example, if an interaction comes into the CEC that relates to upgrades and there is a CSR with a high skill level pertaining to upgrades the system may route the interaction to that CSR even though that CSR may have a longer wait queue than another CSR with a lower skill rank in that type of task.

Some systems also enhance such models to include skill levels indicating the degree of experience that an employee has in a specific area. For example, an employee may have handled a certain type of work for a number of years throughout their career. That employee will likely be more skilled at handling that type of work than another employee who has less experience in the same area. In such a situation, the GAR should favor the insights it gains from the former employee more so than the latter. Such insights will therefore carry more weight in the decision-making process. Further, it should be understood that if the CSR handling the interaction has a higher skill ranking than previous CSR's the system may not provide any recommendation to that CSR for that interaction. Further, it should be understood that the system may also incorporate procedures for lowing the likelihood of the recommendation of actions taken by CSRs with low skill rankings. Further, it should be understood that a CSRs skill level for a particular type of skill may change over time. The skill level weight should be the CSRs current skill level at the time the action was taken.

The objects and advantages will appear more fully from the following detailed description made in conjunction with the accompanying drawings.

BRIEF DESCRIPTION OF THE DRAWING(S)

DETAILED DESCRIPTION OF THE DRAWING(S)

Figure 1:
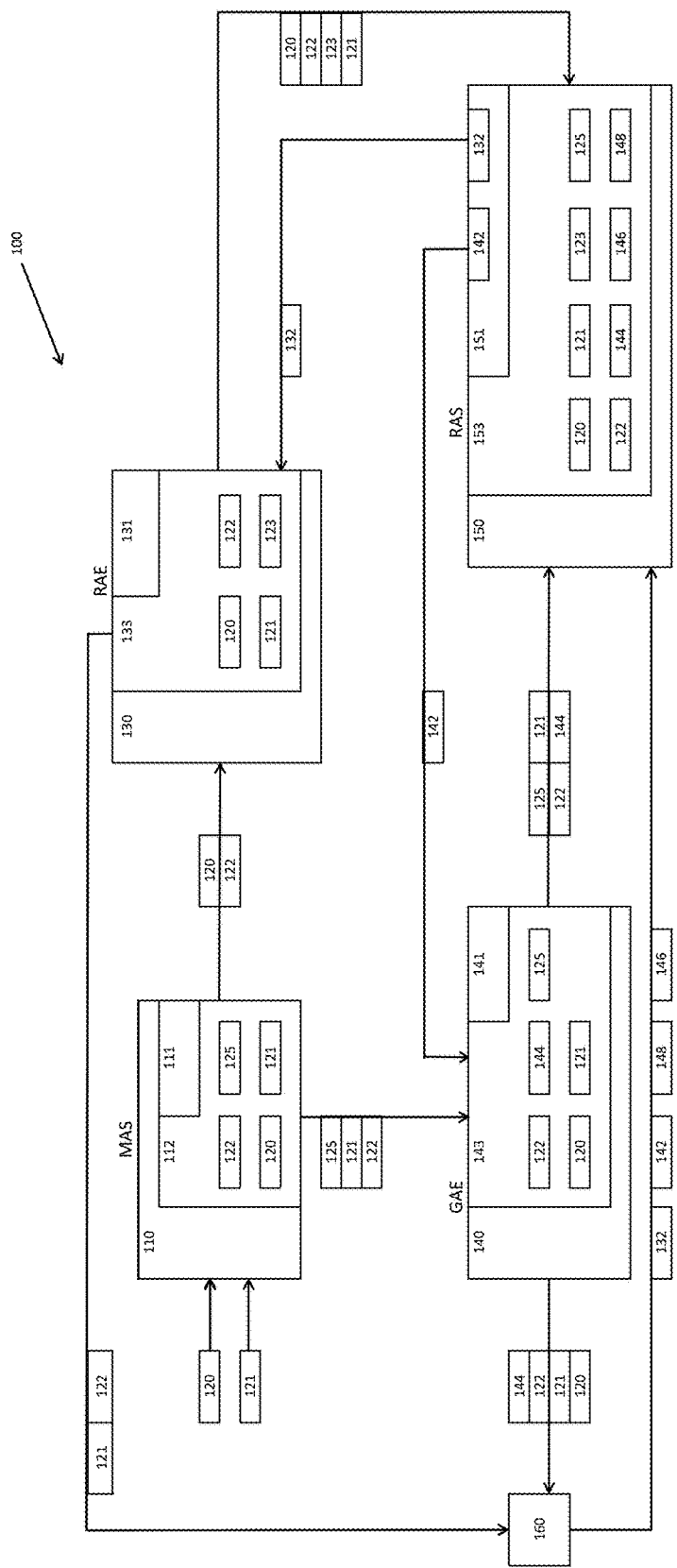
FIG. 1 depicts an exemplary embodiment of a CEC system for automatedly routing incoming customer interactions and recommending guidance to CSRs in handling customer interactions based on incorporating customer survey feedback, customer sentiment feedback, and feedback based on the results of CSR recommendations.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By providing organized and integrated computer-based customer service resources and efficient intelligent routing of incoming customer communication through incorporating customer survey feedback, customer sentiment feedback, and feedback on CSR decisions regarding recommendations, the CEC system can allow an organization to achieve several key benefits. These benefits will be increased through the dynamic automated updating of analysis rules. First, the system will ensure intelligent real-time routing decisions. Second, the CEC system's adaptive nature allows it to adjust to new protocols, individual CSR successful habits and preferences, and customers' preferences. Third, the CEC system's interlinked and adaptive nature allows it to adjust to wide-scale organizational habits and preferences developed over time, and to provide accurate feedback for evaluation of the use of available resources.

In embodiments, it is desirable for the system to update the RAR and GAR used by the CEC system to utilize analyzed data. This permits the system to adapt to changes in customer feedback in the form of customer surveys and customer sentiment. It also allows the system to weigh the decisions made by CSRs based on their changing skill levels for a particular skill. In an embodiment, it is desirable to update the analytics rules (RAR and GAR) based on the customer's sentiment in response to a CSR action. In another embodiment, it is desirable to update the analytics rules (RAR and GAR) based on the customer's feedback survey. In another embodiment, it is desirable to update the analytics rules (RAR and GAR) based on the CSR action taken balanced by the CSR skill. This may be accomplished in real-time or in batches to train the system. In another embodiment, it is desirable to update the analytics rules based on input from a CEC desktop.

In embodiments, it is desirable for the system to analyze incoming customer communication to create metadata and then route the incoming communication according to dynamically updated RARs. This allows the system to intelligently route incoming communication. In embodiments, it is desirable for the system to monitor and analyze ongoing customer communication to create and pull metadata and stored data and then make guidance recommendations according to dynamically updated GARs. This allows the system to intelligently make recommendations based on updated current information about the communication, the CSR, and the customer. Guidance provided by the system can include, but is not limited to a recommendation on what script(s) to read, a recommendation to provide the client with an article or to consult an article, a recommendation on products to offer to the client, a notification that the client is a difficult client or has particular requirements, and/or a recommendation as to which CEC tool(s) the CSR should use for the current interaction.

FIG. 1 depicts an exemplary embodiment of CEC system 100 for automatedly routing incoming customer interactions and recommending guidance to CSRs in handling customer interactions based on incorporating customer survey feedback, customer sentiment feedback, and feedback based on the results of CSR recommendations.

CEC system 100 includes a MAS unit 110 having a MAS software module 111 and an optional MAS storage 112. MAS unit 110 may be a processor or a combination of a processing system and a storage system. MAS unit 110 receives incoming communications, which are either initial communications 120 or monitored communications 121 from outside the CEC system 100. An initial communication is a communication that is not part of a monitored communication and has not been previously routed to a CSR. A monitored communication is an incoming communication that is part of an ongoing customer interaction that has already been routed and has a set of stored data 125 associated with it. The set of stored data 125 may include for example, metadata from prior incoming communications associated with the current incoming monitored communication the CSR designation for the incoming communication, a set of CSR skill levels associated with the CRS designation, etc. The MAS unit 110 analyzes the initial communications 120 and the monitored communications 121 using MAS software module 111 to generate communication metadata 122. Optionally, MAS unit 110 may also pass a copy of the initial communications 120, monitored communications 121, the set of stored data 125, and/or communication metadata 122 to internal or external MAS storage 112 for permanent or temporary storage.

Incoming communications, both initial communications 120 and monitored communications 121, may be audio communication such as a telephone call, a voice message, a video chat, or any other type of audio communication, written communication such as an email, an online posting, a direct message from a customer, or any other written communication. The analysis of initial communications 120 and monitored communications 121 may include a variety of techniques such as speech analytics or textual analytics of audio communications or textual communications between customers and CSRs. The initial communications 120 and monitored communications 121 can further include a wide variety of channels of data. These channels can include audio or textual transcripts of phone calls or web data, but can also include more discretely occurring events such as social medial posts, purchases, returns, or warranty claims. The analysis may include determining the client sentiment for the incoming communication and determining the conversation type the incoming communication involves, for example returns or ordering.

Communication metadata 122 may include, but is not limited to, sentiment including tone, word choice of the customer, intent and/or meaning of the incoming communication; presence of threats; the skill type necessary to assist the incoming communication, and/or a list of business entities referenced in the incoming communication 120 and 121. For example, the list of business entities referenced in the communication 120 and 121 may include at least one of a policy, an account, a customer, an involved or associated third party, and/or other parties identified in the communication 120 and 121. In certain embodiments, the intent of the correspondence is expressed as a list of action points ordered by important or urgency.

CEC system 100 also includes a RAE 130 having a RAE software module 131. RAE 130 is configured to constantly receive and analyze routing data within the CEC system 100. Analysis may be a real-time analysis of streaming data or batch analysis of data which is used to train RAE 130. RAE 130 may be a processor or a combination of a processing system and a storage system. RAE 130 receives RAR 132 from rules analysis system (RAS) 150. RAE 130 receives initial communication 120 with communication metadata 122 from MAS unit 110 and analyzes it using RAE software module 131 based on RAR 132 to route initial communication 120. Optionally, RAE 130 may also route communication metadata 122 to the same destination or a different destination from initial communication 120. Optionally, RAE 130 may also pass a copy of initial communication 120 and/or communication metadata 122 to internal or external RAE storage 133 for permanent or temporary storage.

Depending on communication metadata 122 and RAR 132, RAE 130 may route initial communication 120 to a specific CSR, a group of CSRs, a specific queue, or a group of queues. By way of non-limiting example, if initial communication 120 is from a specific customer that has reported an unsatisfactory experience with a particular CSR on a feedback survey, that initial communication may be routed to a different CSR even if that CSR has the highest-ranking skill for the particular initial communication. By way of another non-limiting example, if the communication metadata 122 indicates that the sentiment of the initial communication 120 is unhappy, the initial communication may be transferred to a CSR who has received positive feedback on surveys for dealing with unhappy customers, rather than to a CSR skilled in the particular type of initial communication 120. The RAE routes the communication to the designated CSR. Optionally, the RAE may display the initial communication 120, and/or the communication metadata to a CEC desktop 160.

CSRs may be identified or grouped by level of authority or skill, skill set, product or service line, department, assigned customers or accounts, prior customer interactions, any other quality, or any combination of qualities. Queues and queue groups may be associated with a level of urgency or importance, with one or more specific issues, types of issue, products, services, product lines, service lines, customers, accounts, departments, or groups of departments, any other quality, or any combination of qualities. CSR groups and queue groups may be predetermined or created and updated dynamically to fit current or anticipated needs. By way of non-limiting example, a predetermined CSR group may include all CSRs of a given authority level. By way of further non-limiting example, a dynamic queue group may include queues for a large, very important customer and a specific time-limited issue; this queue group may be dissolved after the time to resolve the issue has expired. By way of further non-limiting example, a dynamic queue group may exclude a specific CSR based on the specific customer that is party to the communication and prior survey feedback provided by that customer.

CEC system 100 also includes a GAE 140 having a GAE software module 141. GAE 140 is configured to constantly receive and analyze guidance data within the CEC system 100. Analysis may be a real-time analysis of streaming data or batch analysis of data which is used to train GAE 140. GAE 140 may be a processor or a combination of a processing system and a storage system. GAE 140 receives GAR 142 from RAS 150. GAE 140 also receives monitored communication 121 with communication metadata 122 and stored data 125 from MAS unit 110. GAE 140 analyzes the monitored communication 121, the communication metadata 122, and the stored data 125 using GAE software module 141 based on GAR 142 and generates guidance 144 to provide to the CSR for the communication. Optionally, GAE 140 may also pass a copy of monitored communication 121, communication metadata 122, stored data 125, and/or guidance 144 to internal or external GAE storage 133 for permanent or temporary storage.

Depending on communication metadata 122, stored data 125, and GAR 142, GAE 140 may recommend guidance to a CSR based on the customer's sentiment feedback, the survey feedback for the specific customer, the survey feedback for the specific CSR, and/or actions taken by other CSRs based on CSR skill ranking. By way of non-limiting example, if monitored communication 121 is from a specific customer that has filled out a feedback survey indicating he/she never wants to be asked to upgrade, GAE 140 may provide guidance to the CSR indicating that information. By way of another non-limiting example, if the communication metadata 122 contains sentiment data indicating that the customer is unhappy, GAE 140 may provide guidance to the CSR directing the CSR to take steps that other CSRs with high skill rankings in dealing with unhappy customers have done and resulted in the customer's sentiment changing to happy. Customer surveys may be sent out to the customer at the time a call is routed to a CSR, after the communication has been terminated, or at any other time during the interaction or after the interaction is complete. Every customer survey is associated with an incoming communication such that the survey may be tailored to the incoming communication and such that the survey data received from the customer when the survey is completed can be associated with the same incoming communication. Customer feedback surveys may be sent and received through all known methods for sending and receiving feedback surveys, including, but not limited to physically through US mail or other postal methods, digitally through email, text chat, or a survey system. Customer survey data may be received at the CEC through all of the above methods and another other methods known for receiving feedback. Based on the manner the survey data is received by the CEC, the data will automatedly be entered into the system and associated with the incoming communication related to the survey or may need to be manually entered into the system by a CSR or other employee of the CEC.

CEC system 100 also includes at least one CSR desktop 160 used by the CSR for viewing initial communication 120, monitored communication 121, guidance 144, and optionally communication metadata 122. CEC desktop 160 may also receive input for updating RAR 132, GAR 142, and receives input of the action taken by the CSR 146. CEC desktop 160 may also receive input for updating survey feedback 148.

CEC system 100 also includes a RAS 150 having a RAS software module 151. RAS 150 is configured to constantly receive and analyze data and automatedly update RAR 132 and GAR 142 within CEC system 100. Analysis may be a real-time analysis of streaming data or batch analysis of data for training the RAS 150. RAS 150 includes at least one set of RAR 132 and at least one set of GAR 142 used to analyze data. RAS 150 may be a processor or a combination of a processing system and a storage system. RAS 150 receives initial communications 120, communication metadata 122, and CSR designation 123 from RAE 130. RAS 150 also receives monitored communication 121, communication metadata 122, stored data 125, and guidance 144 from GAE 140. RAS 150 receives a CSR action 146 and survey feedback 148 from CSR desktop 160. RAS 150 analyzes the data received and updates RAR 132 and GAR 142 according to the analysis. In one embodiment, the RAS is configured to analyze the CSR action and the guidance in conjunction with the CSR skill ranking. In another embodiment, the RAS software module is configured to analyze the sentiment metadata in conjunction with the CSR action. In an embodiment, the RAS software module is configured to analyze the feedback survey data in conjunction with the CSR action.

RAR 132 includes rules conditioned on metadata 122 including sentiment and skill type, CSR or CSR group availability, CSR or CSR group workload, CSR or CSR group skills, CSR skill ranking, and survey feedback 148. RAR 132 may be dynamically updated by RAS 150 and/or a user or third party utilizing CEC desktop 160. Updates may be manual or automatic. Automatic updates to RAR 132 may be triggered by meeting certain criteria within RAR 132 of RAS 150, or may occur at predetermined intervals, or may occur in real-time. RAR 132 may be software programs or separate files executed by a software program.

GAR 142 includes rules conditioned on metadata 122 including sentiment and skill type, CSR skills, CSR skill ranking, guidance 144, CSR action 146, and survey feedback 148. GAR 142 may be dynamically updated by RAS 150 and/or a user or third party utilizing CEC desktop 160. Updates may be manual or automatic. Automatic updates to GAR 142 may be triggered by meeting certain criteria within GAR 142 of RAS 150, or may occur at predetermined intervals, or may occur in real-time. GAR 142 may be software programs or separate files executed by a software program.

A CSRs skill level, ranking, and skill set may change over time based on survey feedback 148, customer sentiment feedback 122, and other sources of feedback. The changes to a CSRs still level, ranking, and skill set may be updated manually or automatically. Automatic updates to CSR skill may be triggered by certain criteria within RAR 132 of RAS 150, certain criteria within GAR 142 of RAS 150, or may occur at predetermined intervals, or may occur in real-time based on customer survey feedback and customer sentiment feedback.

Figure 2A:
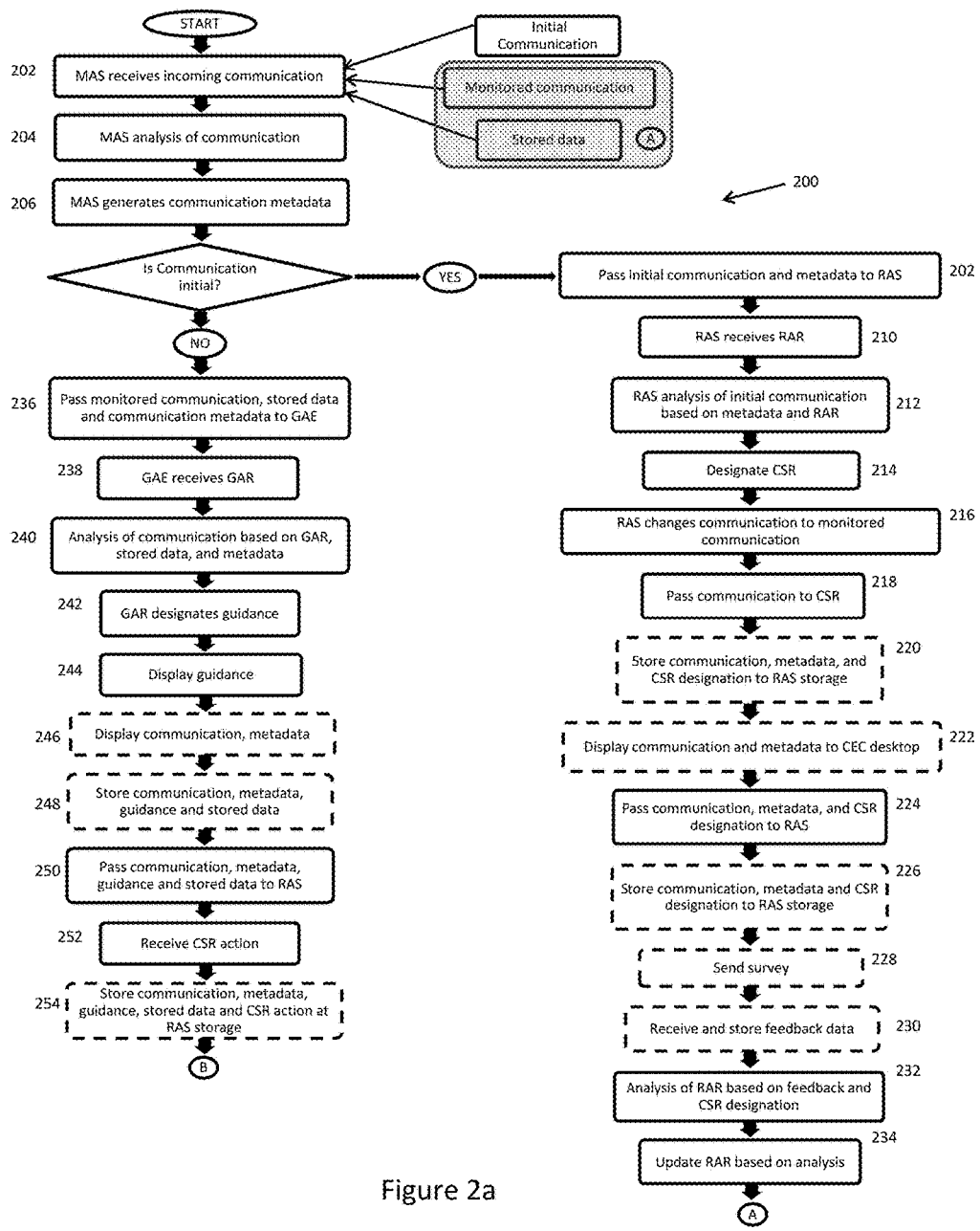
FIGS. 2a and 2b depict a flowchart of an exemplary embodiment of a method of automatedly routing incoming customer interactions and recommending guidance to CSRs in handling customer interactions based on incorporating customer survey feedback, customer sentiment feedback, and feedback based on the results of CSR recommendations.
Figure 2B:
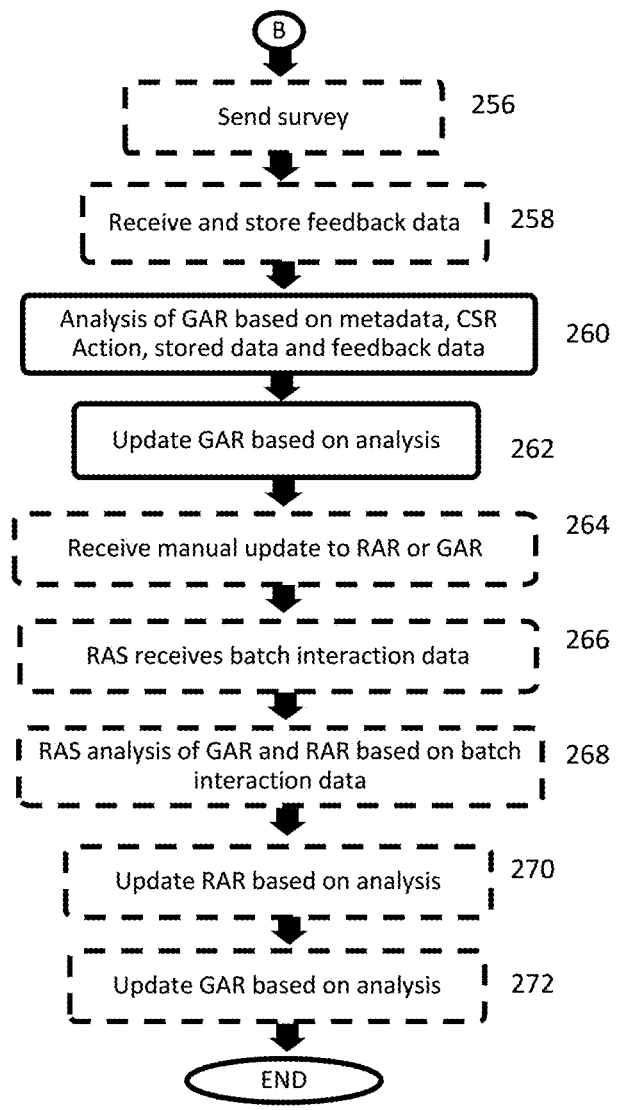

FIGS. 2a and 2b depict a flowchart of an exemplary embodiment of method 200 for automatedly routing incoming customer interactions and recommending guidance to CSRs in handling customer interactions based on incorporating customer survey feedback, customer sentiment feedback, and feedback based on the results of CSR recommendations.

In step 202, the MAS unit receives a communication from outside the CEC system. The communication may be an initial communication that needs to be routed before guidance is provided or the communication may be part of an ongoing monitored communication that has already been routed. Monitored communications are also associated with stored data that the MAS unit also receives. The communications may be multi-sided, such as, but not limited to, a three-way telephone call or an instant message exchange between a CSR and a customer, or one-sided, such as, but not limited to, an email composed by a customer. The stored data may include, but is not limited to a CSR designation, a set of CSR skill levels for the designated CSR, previous metadata from prior communications associated with the monitored communication.

In step 204, the MAS unit performs an analysis of the incoming communication using the MAS software module. The analysis may evaluate the communication message content, existing stored data in the case of monitored communications, existing metadata including whether the communication is an initial communication or a monitored communication, header data, and attachments. In one embodiment, the MAS unit analyzes the communication for sentiment. In other embodiments, the MAS analysis does not include sentiment analysis. In some embodiments, the MAS unit analyzes the communication for conversation type. In other embodiments, the MAS analysis does not include conversation type analysis.

In step 206, the MAS unit generates communication metadata for the communication based on the analysis of step 204. In one embodiment, the metadata will include sentiment metadata. In other embodiments, sentiment metadata will not be included. In other embodiments the metadata will include skill type required for the communication. In other embodiments, skill type metadata will not be included. It should be understood that the metadata is not limited to the above metadata and may include any other useful metadata.

If the communication is an initial communication, in step 208, the MAS unit will pass the communication and the associated communication metadata to a RAE. Optionally, the MAS unit may also pass the communication and/or associated metadata to MAS storage.

In step 210, the RAE receives the current set of RARs from the RAS.

In step 212, the RAS performs an analysis of the initial communication using a RAE software module based on the communication metadata and RARs.

In step 214, the RAE designates a CSR, CSR group, a queue, or a queue group to receive the communication based on the analysis of step 212.

In step 216 the RAE changes the communication from that of an initial communication to a monitored communication.

In step 218, the RAE passes the communication to the designated CSR, CSR group, queue, or queue group from step 214.

In optional step 220, the RAE stores the incoming communication, the communication metadata, and/or the CSR designation to RAE storage.

In optional step 222, the RAE displays the incoming communication, and/pr the communication metadata to the designated CSR, CSR group, queue, or queue group from step 214 and/or to another party on a CEC desktop. This step may occur simultaneously with step 216.

In step 224, the RAE passes the communication, the communication metadata, and the CSR designation to the RAS.

In optional step 226, the RAS stores the communication, the communication metadata, and the CSR designation to the RAS storage.

In optional step 228, the RAS sends a feedback survey to the client. The feedback survey may be an email to which the customer responds, a web-based fill-in form, a written survey delivered by US Mail, or any other type of survey, including third-party survey services. Whatever form the feedback survey takes, it is configured to be associated with the communication, communication metadata, guidance, and CSR action from the specific customer service interaction.

In optional step 230, the RAS receives feedback data. In some embodiments the feedback data is survey data associated with an incoming communication. In other embodiments, the feedback data does not include survey data. The feedback data is not limited in its scope. In some embodiments, the feedback data is part of the metadata generated in step 206.

In step 232, the RAS analyzes the RAR based on feedback data and the CSR designation. In an embodiment the feedback data is survey data associated with an incoming communication. In another embodiment the feedback data is the sentiment data generated as metadata in step 206.

In step 234, the RAS updates the RAR based on the analysis from step 232. At step A, RAE then passes the incoming communication (now a monitored communication), along with the metadata, and CSR designation, collectively stored data, back to step 202 for guidance processing. The stored data may also include any other data associated with the monitored communication including any received feedback data.

If the communication received at step 202 is not an initial communication and has already been routed, steps 208-234 are be skipped. At step 236, the GAE receives the monitored communication, the stored data, and the associated communication metadata from the MAS unit. Optionally, the MAS unit may also pass the communication and/or associated metadata to MAS storage.

In step 238, the GAE receives the current set of GARs from the RAS.

In step 240, the GAE performs an analysis of the communication using a RAE software module based on the, stored data, the communication metadata, and the GARs. In an embodiment the analysis is based off of the GARs and the sentiment data. In another embodiment the analysis is based off of the GARs and the determined skill type of the communication. These are merely examples of the basis for the analysis and are not to be considered limiting.

In step 242, the GAR assigns guidance based on the analysis of step 240.

In step 244, the GAR displays the guidance from step 242 on the CEC desktop.

In optional step 246 the GAR displays the communication and/or the communication metadata on the CEC desktop. It should be understood that this step may occur simultaneously with step 244.

In optional step 248, the GAR may also pass the communication, the communication metadata, the stored data, and/or the guidance to GAR storage. It should be understood that this step may occur simultaneously with steps 244 and 246.

In step 250, the GAR passes the communication, the communication metadata, the stored data, and the guidance to a RAS.

In step 252, the RAS receives the CSR action from the CEC desktop.

In optional step 254, the RAS stores the communication, the communication metadata, the stored data, the guidance, and/or the CSR action to a RAS storage.

In optional step 256, the RAS sends a feedback survey to the client. The feedback survey may be an email to which the customer responds, a web-based fill-in form, a written survey delivered by US Mail, or any other type of survey, including third-party survey services. Whatever form the feedback survey takes, it is configured to be associated with the communication, communication metadata, guidance, and CSR action from the specific customer service interaction.

In optional step 258, the RAS receives feedback data. In some embodiments the feedback data is survey data associated with an incoming communication. In other embodiments, the feedback data does not include survey data. The feedback data is not limited in its scope. In some embodiments, the feedback data is part of the metadata generated in step 206. In yet other embodiments, the feedback data is part of the stored data associated with the monitored communication.

In step 260, the RAS analyzes the GAR based on feedback data and the CSR action. In an embodiment the feedback data is survey data associated with an incoming communication. In another embodiment the feedback data is the sentiment data generated as metadata in step 206. In yet another embodiment, the feedback data is the skill level of the skill type for the designated CSR. In an embodiment, the RAS software module is configured to analyze the feedback survey data in conjunction with the CSR action. In a non-limiting example, if the feedback survey indicates dissatisfaction with the interaction, the RAS may update the RAR to keep that customer from being routed to the particular CSR the customer was dissatisfied with. In the same non-limiting example, the RAS may update the GAR to keep the CSR action associated with the interaction from being provided as guidance in similar interactions.

In step 262, the RAS updates the GAR based on the analysis from step 260.

In optional step 264, the RAS receives an update to the GAR and/or RAR from the CSR or another party. In various embodiments, this step may occur before or after any other step in method 200.

In optional step 266, for training, the RAS receives a batch of previously stored interaction data including communication metadata which may include sentiment data or skill data, associated CSR actions, associated guidance, stored data, CSR designation, associated feedback survey data, and associated communication.

In optional step 268, the RAS analyzes the received data. In one embodiment, the RAS software module is configured to analyze the CSR action and the guidance in conjunction with the CSR skill ranking. In another embodiment, the RAS software module is configured to analyze the sentiment metadata in conjunction with the CSR action. In an embodiment, the RAS software module is configured to analyze the feedback survey data in conjunction with the CSR action. In another embodiment, the RAS software module is configured to analyze the sentiment metadata in conjunction with the CSR designation. In an embodiment, the RAS software module is configured to analyze the feedback survey data in conjunction with the CSR designation.

In optional step 270, the RAS updates the RAR based on the analysis from step 268.

In optional step 272, the RAS updates the GAR based on the analysis from step 268. It should be understood that this step could occur before or simultaneously to step 270.

In various embodiments, optional steps 264-272 may occur before or after or during any other step in method 200.

Figure 3:
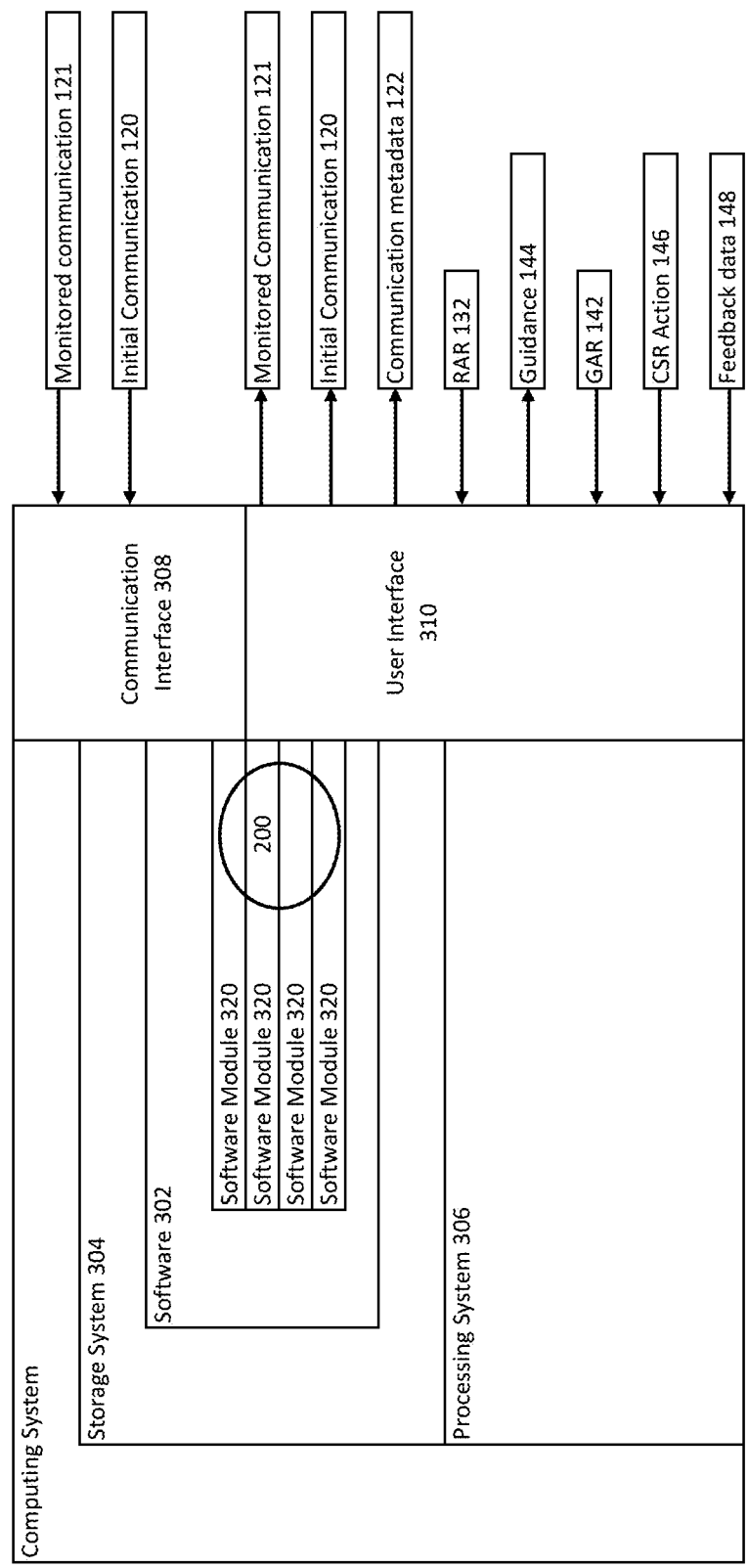
FIG. 3 depicts an exemplary embodiment of a system for automatedly routing incoming customer interactions and recommending guidance to CSRs in handling customer interactions based on incorporating customer survey feedback, customer sentiment feedback, and feedback based on the results of CSR recommendations.

FIG. 3 depicts an exemplary embodiment of a system 300 for automatedly routing incoming customer interactions and recommending guidance to CSRs in handling customer interactions based on incorporating customer survey feedback, customer sentiment feedback, and feedback based on the results of CSR recommendations.

System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes four software modules 320 for performing the functions of MAS software module 111, RAE software module 131, GAE software module 141, and RAS software module 151. Although computing system 300 as depicted in FIG. 3 includes four software modules 320 in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 160, a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display initial communication 120, monitored communication 121, communication metadata 122, guidance 144, CEC desktop 160, or another interface further associated with embodiments of the system and method as disclosed herein. Speakers, printers, haptic devices and other types of output devices may also be included in the user interface 310. A CSR or other staff can communicate with computing system 300 through the user interface 310 in order to view initial communication 120, monitored communication 121, communication metadata 122, guidance 144, update RAR 132, update GAR 142, input a CSR action 146, enter feedback data 148, enter customer input, manage an interaction, or any number of other tasks the CSR or other staff may want to complete with computing system 300.

As described in further detail herein, computing system 300 receives and transmits data through communication interface 308. In embodiments, the communication interface 308 operates to send and/or receive data, such as, but not limited to, initial communication 120 and monitored communication 121 to/from other devices and/or systems to which computing system 300 is communicatively connected, and to receive and process customer input, as described in greater detail above. The customer input can include initial communication 120, monitored communication 121, details about a request, work order or other set of information that will necessitate an interaction between the customer and the representative. Customer input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for routing based on customer survey feedback, comprising:
   receiving an incoming communication, wherein the incoming communication is designated as an initial communication;
   performing an analysis of the incoming communication using a metadata analytics service (MAS) software module on a MAS;
   generating communication metadata for the incoming communication based on the analysis of the MAS software module;
   passing the incoming communication and the communication metadata associated with the incoming communication to a routing analysis engine (RAE);
   receiving a set of routing analytics rules (RAR) at the RAE;
   performing an analysis of the incoming communication using a RAE software module based on the communication metadata and the set of RAR;
   designating at least one customer service representative (CSR) designation to receive the incoming communication, wherein the CSR designation is at least one of a CSR, a CSR group, a queue, or a queue group;
   changing the designation of the incoming communication to a monitored communication, wherein the incoming communication is received designated as initial communication, further wherein the initial incoming communication is designated as monitored communication once the initial incoming communication has been assigned to the least one CSR to receive the incoming communication and the incoming communication becomes part of an ongoing customer interaction;
   passing the incoming communication to the CSR designation to receive the incoming communication;
   passing the incoming communication, the CSR designation, and the communication metadata to a rules analytics service (RAS);
   storing the incoming communication, the CSR designation, and the communication metadata to a RAS storage;
   receiving customer survey data associated with the incoming communication;
   performing an analysis of the set of RAR using a RAS software module based on the customer survey data, the incoming communication, the CSR designation, and the communication metadata; and
   updating the set of RAR based on the analysis of the RAS software module.

2. The method of claim 1, wherein the generation of communication metadata includes generating a textual transcript of the incoming communication.

3. The method of claim 2, the method further comprising displaying the textual transcript on a customer engagement center (CEC) desktop.

4. The method of claim 1, the method further comprising:
   the RAS software module receiving a set of customer survey data along with a set of associated incoming communications and a set of associated communication metadata;
   performing an analysis of the set of RAR using the RAS software module based on the set of incoming communication, the set of communication metadata, and the set of associated customer survey data; and
   updating the set of RAR based on the analysis of the RAS software module.

5. The method of claim 1, wherein the customer survey data received is a printed survey response received by mail.

6. The method of claim 1, wherein the customer survey data received is a digital response to a digital survey.

7. A method for providing guidance based on customer survey feedback, comprising:
   receiving an incoming communication, wherein the incoming communication is designated as a monitored communication, wherein the incoming communication designated as monitored communication is part of an ongoing customer interaction which customer interaction has already been assigned to least one of a customer service representative (CSR) designation, wherein the CSR designation is at least one of a CSR, a CSR group, a queue, or a queue group;
   receiving a set of stored data associated with the incoming communication;
   performing an analysis of the incoming communication using a metadata analytics service (MAS) software module on a MAS;
   generating communication metadata for the incoming communication based on the analysis of the MAS software module;
   passing the incoming communication, the set of stored data, and the communication metadata to a guidance analysis engine (GAE);
   receiving a set of guidance analytics rules (GAR) at the GAE;
   performing an analysis of the incoming communication using a GAE software module based on the communication metadata and the set of GAR;
   assigning at least one guidance to the incoming communication based on the analysis of the GAE software module;
   displaying the guidance on a customer engagement center (CEC) desktop;
   passing the guidance, the incoming communication, the stored data, and the communication metadata to a rules analytics service (RAS);

receiving a customer service representative (CSR) action associated with the incoming communication;
storing the incoming communication, the communication metadata, the stored data, the guidance, and the CSR action to a RAS storage;
receiving customer survey data associated with the incoming communication;
performing an analysis of the set of GAR using a RAS software module based on the customer survey data and the CSR action; and
updating the set of GAR based on the analysis of the RAS software module.

8. The method of claim 7, wherein the generation of communication metadata includes generating a textual transcript of the incoming communication.

9. The method of claim 8, the method further comprising displaying the textual transcript on the CEC desktop.

10. The method of claim 7, wherein the RAS software module analysis is based on the customer survey data, the guidance, the incoming communication, the communication metadata, and the CSR action.

11. The method of claim 7, the method further comprising:
the RAS software module receiving a set of customer survey data along with a set of associated incoming communications, a set of associated communication metadata, and a set of associated CSR actions;
performing an analysis of the GAR using the RAS software module based on the set of incoming communication, the set of communication metadata, the set of CSR actions, and the set of associated customer survey data; and
updating the set of GAR based on the analysis of the RAS software module.

12. The method of claim 11, wherein the RAS software module receives a set of guidance associated with the set of customer survey data.

13. The method of claim 12, wherein the RAS software module analysis is based on the set of guidance in addition to the set of incoming communications, the set of communication metadata, and the set of associated customer survey data, and the set of CSR actions.

14. The method of claim 7, wherein the customer survey data received is a printed survey response received by mail.

15. The method of claim 7, wherein the customer survey data received is a digital response to a digital survey.

16. A system for routing and guidance of incoming communications based on customer survey feedback, comprising:
a processor; and
a non-transitory computer readable medium programmed with computer readable code that upon execution by the processor causes the processor to:
receive an incoming communication from outside a customer engagement center (CEC) system, wherein the incoming communication is designated as one of an initial communication or a monitored communication, wherein the incoming communication designated as monitored communication includes a set of stored data associated with the initial communication, further wherein the incoming communication designated as monitored communication is part of an ongoing customer interaction which customer interaction has already been assigned to least one of a customer service representative (CSR) designation, wherein the CSR designation is at least one of a GSA, a CSR group, a queue, or a queue group,
perform an analysis of the incoming communication using a metadata analytics service (MAS) software module on a MAS unit,
generate communication metadata for the incoming communication based on the analysis of the MAS software module,
when the incoming communication is designated as initial communication, the MAS passes the incoming communication and the communication metadata to a routing analysis engine (RAE), wherein the RAE causes the processor to:
receive a set of routing analytics rules (RAR) at the RAE,
perform an analysis of the incoming communication using a RAE software module based on the communication metadata and the set of RAR,
designate one of a customer service representative (CSR), CSR group, a queue, or a queue group to receive the incoming communication based on the analysis of the RAE software module, wherein the initial incoming communication is designated as monitored communication once the initial incoming communication has been assigned to the least one GSA designation to receive the incoming communication and the incoming communication becomes part of an ongoing customer interaction,
change the incoming communication designation to monitored communication using the RAE software module, pass the incoming communication to the designated CSR, CSR group, queue, or queue group,
pass the incoming communication, the communication metadata, and the CSR designation, using the RAE software module, to a rules analytics service (RAS) software module, store the incoming communication, the CSR designation, and the communication metadata to a RAS storage, receive customer survey data associated with the incoming communication,
perform an analysis of the set of RAR using the RAS software module based on the customer survey data, the incoming communication, the CSR designation, and the communication metadata, and
update the set of RAR based on the analysis of the RAS software module,
when the incoming communication is designated as monitored communication, the MAS passes the incoming communication, the set of stored data, and the communication metadata to a guidance analysis engine (GAE), wherein the GAE causes the processor to:
receive a set of guidance analytics rules (GAR) at the GAE,
perform an analysis of incoming communication using a GAE software module based on the communication metadata, the stored data, and the set of GAR,
assign a guidance based on the analysis of the GAE software module,
display the guidance on a CEC desktop,
pass the guidance, the incoming communication, the communication metadata, and the stored data, using the GAE software module, to the RAS software module,
receive a CSR action associated with the incoming communication, store the incoming communication, the communication metadata, the guidance, the stored data, and the CSR action to the RAS storage, receive customer survey data associated with the incoming communication, perform an analysis of the GAR using the RAS software module based on the customer survey data and the CSR action, and update the set of GAR based on the analysis of the RAS software module.

17. The system of claim 16, wherein the
the RAS software module instructs the processor to receive a set of customer survey data along with a set of associated incoming communications, a set of associated CSRs, a set of associated CSR actions, and a set of associated communication metadata, performs an analysis of the RAR using the RAS software module based on the set of incoming communications, the set of communication metadata, the set of designated CSRs, and the set of associated customer survey data, updates the set of RAR based on the analysis of the RAS software module, performs an analysis of the GAR using the RAS software module based on the set of incoming communication, the set of communication metadata, the set of CSR actions, and the set of associated customer survey data, and updates the set of GAR based on the analysis of the RAS software module.

18. The system of claim 16, wherein the customer survey data received is a printed survey response received by mail.

19. The system of claim 16, wherein the customer survey data received is a digital response to a digital survey.

20. The system of claim 16, wherein the RAS software module analysis includes the guidance in addition to the incoming communication, the communication metadata, the customer survey data, and the CSR action.

\* \* \* \* \*